(12) United States Patent
Chiba

(10) Patent No.: US 11,824,465 B2
(45) Date of Patent: Nov. 21, 2023

(54) POWER CONVERSION DEVICE AND FAILURE DETERMINATION METHOD

(71) Applicant: Mitsubishi Electric Corporation, Tokyo (JP)

(72) Inventor: Yoshinori Chiba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 377 days.

(21) Appl. No.: 17/297,086

(22) PCT Filed: Nov. 30, 2018

(86) PCT No.: PCT/JP2018/044163
§ 371 (c)(1),
(2) Date: May 26, 2021

(87) PCT Pub. No.: WO2020/110288
PCT Pub. Date: Jun. 4, 2020

(65) Prior Publication Data
US 2022/0029557 A1  Jan. 27, 2022

(51) Int. Cl.
*H02M 7/5387* (2007.01)
*B60L 9/24* (2006.01)
*B60M 3/02* (2006.01)
*H02M 1/32* (2007.01)

(52) U.S. Cl.
CPC ........... *H02M 7/53875* (2013.01); *B60L 9/24* (2013.01); *B60M 3/02* (2013.01); *H02M 1/32* (2013.01); *B60L 2200/26* (2013.01)

(58) Field of Classification Search
CPC ....... H02M 7/53875; H02M 1/32; B60L 9/24; B60L 2200/26; B60M 3/02

USPC .......................................................... 363/56
See application file for complete search history.

(56) References Cited

U.S. PATENT DOCUMENTS

2017/0361716 A1* 12/2017 Sato ...................... H02M 7/219

FOREIGN PATENT DOCUMENTS

| JP | 2012170266 A | * | 9/2012 | ................ B60L 3/00 |
| JP | 2012170266 A | | 9/2012 | |
| JP | 2016181982 A | * | 10/2016 | .............. H02M 7/48 |
| JP | 2016181982 A | | 10/2016 | |

OTHER PUBLICATIONS

International Search Report (PCT/ISA/210) and Written Opinion (PCT/ISA/237) dated Feb. 5, 2019, by the Japan Patent Office as the International Searching Authority for International Application No. PCT/JP2018/044163.

* cited by examiner

*Primary Examiner* — Yemane Mehari
(74) *Attorney, Agent, or Firm* — BUCHANAN INGERSOLL & ROONEY PC

(57) ABSTRACT

A power conversion apparatus includes a filter capacitor, a contactor to electrically connect the filter capacitor to a power source or electrically disconnect the filter capacitor from the power source, and a failure determiner to determine whether a failure occurs in the contactor. When the contactor is kept closed during a determination period since closing of the contactor and a reduction in the voltage in the filter capacitor during the determination period is greater than or equal to a reference value, the failure determiner determines occurrence of a failure in the contactor.

19 Claims, 5 Drawing Sheets

POWER CONVERSION DEVICE AND FAILURE DETERMINATION METHOD

TECHNICAL FIELD

The present disclosure relates to a power conversion apparatus and a failure determining method.

BACKGROUND ART

Some electric railway vehicles are provided with power conversion apparatuses installed therein. The power conversion apparatuses convert electric power fed from a substation via an overhead wire into desired alternating-current (AC) power, and supply the converted electric power to a motor. A typical example of such power conversion apparatuses is disclosed in Patent Literature 1. The power conversion apparatus disclosed in Patent Literature 1 includes a contactor, an inverter to convert direct-current (DC) power fed from a power source via primary terminals of the inverter into AC power and supply the AC power to a load connected to secondary terminals of the inverter, a filter capacitor connected to the primary terminals of the inverter and configured to be charged with electric power fed from the power source, and a controller to close or open the contactor.

CITATION LIST

Patent Literature

Patent Literature 1: Unexamined Japanese Patent Application Publication No. 2012-170266

SUMMARY OF INVENTION

Technical Problem

The contactor included in the power conversion apparatus disclosed in Patent Literature 1 is controlled by the controller and electrically connects the inverter to the power source or electrically disconnects the inverter from the power source. The power conversion apparatus determines whether a failure occurs in the contactor, on the basis of whether the filter capacitor is charged after the closing of the contactor. The charging of the filter capacitor can be determined on the basis of whether the voltage in the filter capacitor increases to a threshold voltage or higher immediately after the closing of the contactor. Setting the threshold voltage at a sufficiently small value enables to shorten a period for a process of determining whether the filter capacitor is charged. Unfortunately, a failure may occur in the contactor included in the power conversion apparatus, for example, after the start of charging of the filter capacitor. In this case, the power conversion apparatus cannot determine whether a failure occurs in the contactor after the increase in the voltage in the filter capacitor, because the power conversion apparatus is configured to determine the charging of the filter capacitor at the time of arrival of the voltage in the filter capacitor at the threshold voltage or higher.

An objective of the present disclosure, which has been accomplished in view of the above situations, is to determine whether a failure occurs in the contactor after the start of charging of the filter capacitor.

Solution to Problem

In order to achieve the above objective, a power conversion apparatus according to the present disclosure includes a power converter, a filter capacitor, a contactor, a first voltage measurer, a contactor controller, and a failure determiner. The power converter converts DC power fed from a power source via one of primary terminals of the power converter into DC power or AC power, and supplies the converted power to a load connected to secondary terminals of the power converter. The filter capacitor has terminals connected between the primary terminals of the power converter and is charged with electric power fed from the power source. The contactor electrically connects the power converter to the power source, or electrically disconnects the power converter from the power source. The first voltage measurer measures a first voltage value that is a value of a voltage between the terminals of the filter capacitor. The contactor controller, by closing the contactor, causes the contactor to electrically connect the power converter to the power source, or by opening the contactor, causes the contactor to electrically disconnect the power converter from the power source. The failure determiner determines whether a failure occurs in the contactor, based on whether the contactor is kept closed during a preset determination period since closing of the contactor by the contactor controller and a variation in the first voltage value during the determination period.

Advantageous Effects of Invention

The power conversion apparatus according to the present disclosure can determine whether a failure occurs in the contactor on the basis of whether the contactor is kept closed during the preset determination period since the closing of the contactor and the variation in the value of the voltage between the terminals of the filter capacitor during the determination period. This configuration can achieve determination of whether a failure occurs in the contactor after the start of charging of the filter capacitor.

DESCRIPTION OF EMBODIMENTS

Figure 1:
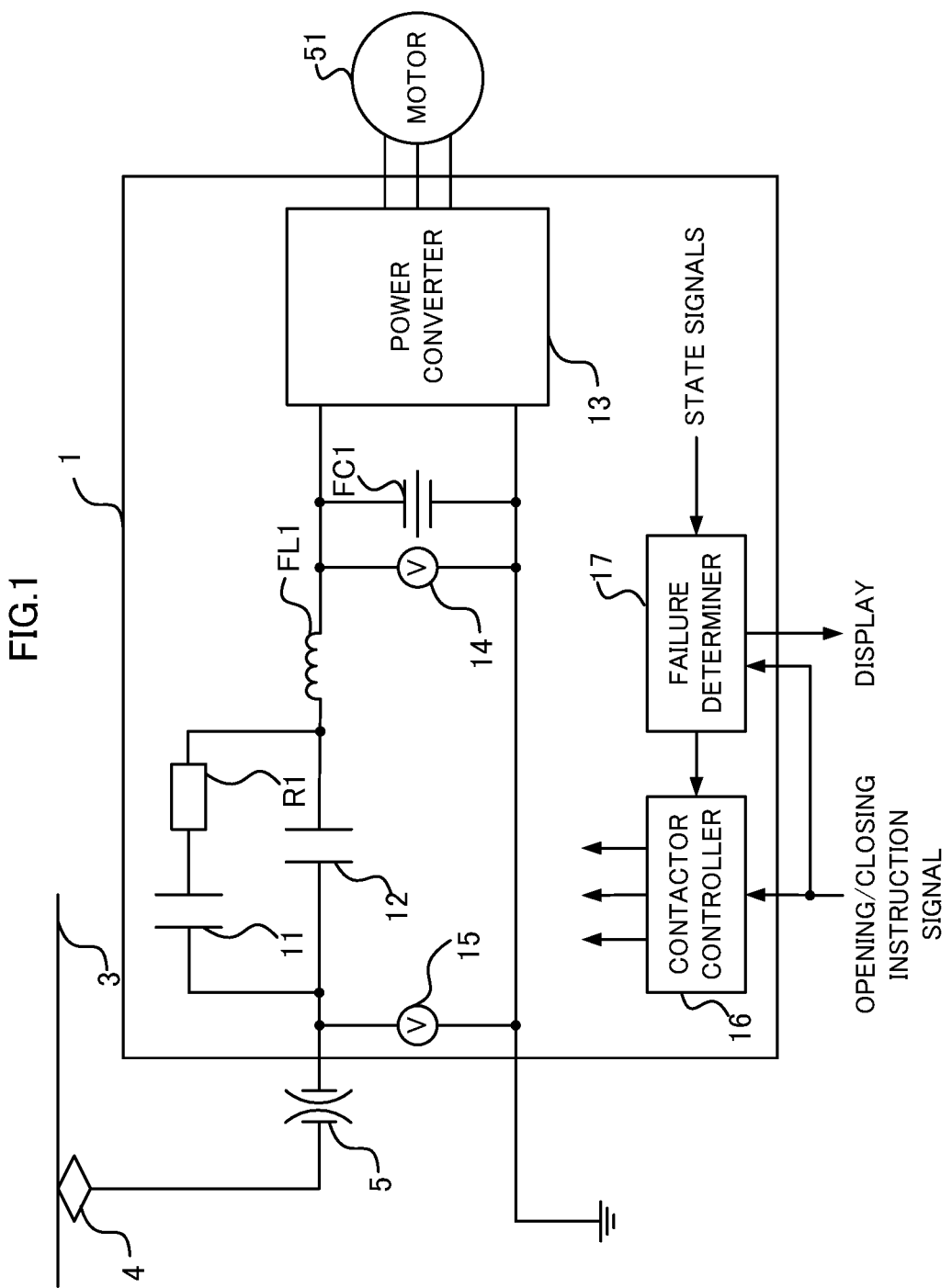
FIG. 1 is a block diagram of a power conversion apparatus according to Embodiment 1 of the present disclosure.

A power conversion apparatus according to embodiments of the present disclosure is described in detail with reference to the accompanying drawings. In the drawings, the components identical or corresponding to each other are provided with the same reference symbol.

Embodiment 1

An electric railway vehicle is provided with a power conversion apparatus installed therein. The power conversion apparatus converts direct-current (DC) power fed from a substation via an overhead wire into alternating-current (AC) power and supplies the AC power to a motor. Embodiment 1 is directed to a power conversion apparatus installed in an electric railway vehicle in a DC feeding system.

A power conversion apparatus 1 according to Embodiment 1 in FIG. 1 converts the fed DC power into AC power for driving a motor 51, and supplies the AC power to the motor 51. A current collector 4 acquires DC power from a substation, which serves as a DC power source, via an overhead wire 3, and supplies the electric power via a high-speed circuit breaker 5 to the power conversion apparatus 1. The high-speed circuit breaker 5 electrically connects the power conversion apparatus 1 to the current collector 4 or electrically disconnects the power conversion apparatus 1 from the current collector 4. The high-speed circuit breaker 5 is controlled by a non-illustrated circuit breaker controller. The motor 51 includes, for example, a three-phase induction motor. The electric power supplied from the power conversion apparatus 1 to the motor 51 drives the motor 51, thereby providing thrust to an electric railway vehicle.

The power conversion apparatus 1 includes a contactor 11 having one end connected to the high-speed circuit breaker 5, a resistor R1 having one end connected in series to the other end of the contactor 11, a contactor 12 connected in parallel to the series circuit containing the contactor 11 and the resistor R1, a filter reactor FL1 having one end connected to the other end of the resistor R1 and configured to reduce harmonic components, and a filter capacitor FC1 having one end connected to the other end of the filter reactor FL1 and the other end that is grounded.

The power conversion apparatus 1 further includes a power converter 13 having primary terminals between which the filter capacitor FC1 is connected and secondary terminals individually connected to the motor 51 and configured to convert the DC power fed via one of the primary terminals into three-phase AC power and supply the AC power to the motor 51, a first voltage measurer 14 to measure a first voltage value EFC indicating the value of a voltage between the terminals of the filter capacitor FC1, a second voltage measurer 15 configured to measure a second voltage value ES indicating the value of a voltage between the one end of the contactor 11 and the other of the primary terminals of the power converter 13, a contactor controller 16 to close or open the contactors 11 and 12 independently, and a failure determiner 17 to determine whether a failure occurs in the contactor 11.

The contactors 11 and 12 each include a DC electromagnetic contactor. The contactors 11 and 12 are individually controlled by the contactor controller 16, which is described below.

The one end of the contactor 11 is connected to the high-speed circuit breaker 5, while the other end of the contactor 11 is connected to the resistor R1. When the contactor controller 16 closes the contactor 11, the one and other ends of the contactor 11 are connected to each other. The high-speed circuit breaker 5 and the resistor R1 are thus electrically connected to each other. The contactor 11 in this state outputs a state signal at a high level, which indicates that the contactor 11 is closed. The closing of the high-speed circuit breaker 5 and the contactor 11 achieves electrical connection of the power converter 13 to the current collector 4.

When the contactor controller 16 opens the contactor 11, the one and other ends of the contactor 11 are insulated from each other. The resistor R1 is thus electrically disconnected from the high-speed circuit breaker 5. The contactor 11 in this state outputs a state signal at a low level, which indicates that the contactor 11 is open, that is, the contactor 11 is not closed.

The one end of the contactor 12 is connected to the high-speed circuit breaker 5, while the other end of the contactor 12 is connected to the one end of the filter reactor FL1. When the contactor controller 16 closes the contactor 12, the one and other ends of the contactor 12 are electrically connected to each other. The high-speed circuit breaker 5 and the filter reactor FL1 are thus electrically connected to each other. The contactor 12 in this state outputs a state signal, which indicates that the contactor 12 is closed. The closing of the high-speed circuit breaker 5 and contactor 12 achieves electrical connection of the power converter 13 to the current collector 4.

When the contactor controller 16 opens the contactor 12, the one and other ends of the contactor 12 are insulated from each other. The filter reactor FL1 is thus electrically disconnected from the high-speed circuit breaker 5. The contactor 12 in this state outputs a state signal, which indicates that the contactor 12 is open, that is, the contactor 12 is not closed.

The one end of the resistor R1 in FIG. 1 is connected to the other end of the contactor 11, while the other end of the resistor R1 is connected to the one end of the filter reactor FL1.

The one end of the filter reactor FL1 is connected to the other end of the resistor R1 and the other end of the contactor 12, while the other end of the filter reactor FL1 is connected to the one end of the filter capacitor FC1 and the one of the primary terminals of the power converter 13. The filter reactor FL1 reduces harmonic components.

The filter capacitor FC1 is connected between the primary terminals of the power converter 13. The filter capacitor FC1 is charged with the electric power acquired by the current collector 4 via the overhead wire 3.

The power converter 13 converts the DC power fed via the one of the primary terminals into three-phase AC power, and supplies the three-phase AC power to the motor 51 connected to the secondary terminals. In detail, a non-illustrated switching controller controls the switching elements included in the power converter 13, so that the power converter 13 converts DC power into three-phase AC power and outputs the three-phase AC power to the motor 51. The power converter 13 includes, for example, a variable voltage variable frequency (VVVF) inverter.

The contactor controller 16 receives, from a non-illustrated cab, an opening/closing instruction signal for instructing the contactor controller 16 to close or open the contactor 11 or 12. The contactor controller 16 closes or opens the contactor 11 or 12 in accordance with the opening/closing instruction signal.

The failure determiner 17 receives the state signals from the respective contactors 11 and 12 and the opening/closing instruction signal from the cab. The failure determiner 17 acquires the first voltage value EFC from the first voltage measurer 14 and the second voltage value ES from the second voltage measurer 15. The failure determiner 17 stores the acquired first voltage value EFC into a non-illustrated storage. On the basis of the state signals, the first voltage value EFC, and the second voltage value ES, the failure determiner 17 determines whether a failure occurs in the contactor 11, as explained below. In addition, the failure determiner 17 includes a timer to measure a period from the start of the process of determining occurrence of a failure.

As a typical example of a failure in the contactor 11, despite of the state signal indicating the closing state of the contactor 11, the actual contactor 11 is open after the start of charging of the filter capacitor FC1. In this case, the filter capacitor FC1 is not charged because the actual contactor 11 is open. The filter capacitor FC1 not sufficiently charged cannot activate the power converter 13 to drive the motor 51. A typical existing power conversion apparatus determines whether a failure occurs in the contactor 11 on the basis of the voltage between the terminals of the filter capacitor FC1 immediately after the closing of the contactor 11. Unfortunately, this existing power conversion apparatus cannot determine whether a failure occurs in the contactor 11 after an increase in the voltage between the terminals of the filter capacitor FC1 that follows the start of charging of the filter capacitor FC1.

In order to solve this problem, the failure determiner 17 starts the process of determining occurrence of a failure in response to supply of the opening/closing instruction signal for instructing the closing of the contactor 11. The failure determiner 17 then determines whether the state signal has been at a high level during a preset determination period since the supply of the opening/closing instruction signal for instructing the closing of the contactor 11.

The failure determiner 17 also determines whether a reduction $\Delta EFC$ in the first voltage value EFC during the determination period is greater than or equal to a reference value W1. In detail, on the basis of a first voltage value EFC1 acquired immediately after the start of the process of determining occurrence of a failure and stored in the storage and a most recently acquired first voltage value EFC2, the failure determiner 17 calculates a reduction $\Delta EFC=|EFC1-EFC2|$ in the first voltage value EFC. The failure determiner 17 then compares the reduction $\Delta EFC$ in the first voltage value EFC with the reference value W1.

The failure determiner 17 also determines whether the difference between the first voltage value EFC and the second voltage value ES is greater than or equal to a first threshold voltage Th1, after the lapse of the determination period, for example, at the end of the determination period.

The determination period is longer than the time required for charging of the filter capacitor FC1. Specifically, the determination period is longer than the time defined by the product of the electrostatic capacity of the filter capacitor FC1 and the resistance value of the resistor R1. For example, the determination period is 100 milliseconds or more and one second or less from the supply of the opening/closing instruction signal for instructing the closing of the contactor 11.

The reference value W1 is larger than the range of variation in the DC voltage in the overhead wire 3. For example, the reference value W1 is equal to the one third of the value of the voltage between the terminals of the fully-charged filter capacitor FC1. This configuration can reduce or prevent occurrence of a case in which the determination that a failure occurs in the contactor 11 is erroneously made upon a variation in the DC voltage in the overhead wire 3. The first threshold voltage Th1 is defined depending on the voltage between the terminals of the filter capacitor FC1. For example, the first threshold voltage Th1 is equal to the two thirds of the voltage between the terminals of the fully-charged filter capacitor FC1. The failure determiner 17 preliminarily retains the reference value W1, the first threshold voltage Th1, and a length of the determination period.

On the basis of the combination of the above-described determination results, the failure determiner 17 determines whether (i) the state signal has been at a high level during the determination period and (ii) the reduction $\Delta EFC$ in the first voltage value EFC during the determination period is greater than or equal to the reference value W1 and (iii) the difference between the first voltage value EFC and the second voltage value ES after the lapse of the determination period is greater than or equal to the first threshold voltage Th1. The failure determiner 17 then outputs the determination results to a display installed in the cab, for example.

When the failure determiner 17 determines that (i) the state signal has been at a high level during the determination period and (ii) the reduction $\Delta EFC$ in the first voltage value EFC during the determination period is greater than or equal to the reference value W1 and (iii) the absolute difference |EFC−ES| between the first voltage value EFC and the second voltage value ES after the lapse of the determination period is greater than or equal to the first threshold voltage Th1, then the failure determiner 17 supplies the display with a failure determination signal, which indicates occurrence of a failure in the contactor 11, as the determination result. Checking out the information displayed on the display, which indicates occurrence of a failure in the contactor 11, a driver can fix the contactor 11.

The failure determination signal is at a high level when the failure determiner 17 determines that (i) the state signal has been at a high level during the determination period and (ii) the reduction $\Delta EFC$ in the first voltage value EFC during the determination period is greater than or equal to the reference value W1 and (iii) the absolute difference |EFC−ES| between the first voltage value EFC and the second voltage value ES after the lapse of the determination period is greater than or equal to the first threshold voltage Th1.

The failure determination signal is at a low level when the failure determiner 17 determines that (i) the state signal has not been at a high level during the determination period or (ii) the reduction $\Delta EFC$ in the first voltage value EFC during the determination period is smaller than the reference value W1 or (iii) the absolute difference |EFC−ES| between the first voltage value EFC and the second voltage value ES after the lapse of the determination period is smaller than the first threshold voltage Th1.

Operations of the power conversion apparatus 1 having the above-described configuration are explained.

At the start of driving of the electric railway vehicle, the current collector 4 comes into contact with the overhead wire 3 in response to manipulation of an ascending switch for raising a pantograph, which is a typical example of the current collector 4, and is then supplied with electric power from the substation.

In association with the manipulation of the pantograph ascending switch, the cab supplies an opening/closing instruction signal for instructing the closing of the contactor 11 to the contactor controller 16 and the failure determiner 17. When receiving the opening/closing instruction signal for instructing the closing of the contactor 11, the contactor controller 16 closes the contactor 11. Due to the closing of the contactor 11, the electric power acquired by the current collector 4 from the substation via the overhead wire 3 is fed to the filter capacitor FC1 via the high-speed circuit breaker 5, the contactor 11, the resistor R1, and the filter reactor FL1, to thereby start charging of the filter capacitor FC1. The configuration in which the resistor R1 is connected in series to the contactor 11 can reduce or prevent occurrence of a case in which inrush current flows into the filter capacitor FC1 in response to the closing of the contactor 11.

Provided that no failure occurs in the contactor 11, the closing of the contactor 11 is followed by the charging of the filter capacitor FC1 to increase the first voltage value EFC, so that the difference between the first voltage value EFC and the second voltage value ES becomes smaller than a reference voltage difference. When the difference between the first voltage value EFC and the second voltage value ES is determined to be smaller than the reference voltage difference, the contactor controller 16 closes the contactor 12 and then opens the contactor 11. Because of the sufficiently small reference voltage difference, the contactor 12 is closed after the difference between the first voltage value EFC and the second voltage value ES becomes sufficiently small. This configuration can reduce or prevent occurrence of a case in which inrush current flows into the filter capacitor FC1 in response to the closing of the contactor 12.

After the closing of the contactor 12, the non-illustrated switching controller controls the switching elements included in the power converter 13, under a power running instruction from the cab. The power converter 13 then converts the DC power fed via the one of the primary terminals into AC power, and supplies the AC power to the motor 51 connected to the secondary terminals. The supplied AC power drives the motor 51, thereby providing thrust to the electric railway vehicle.

Figure 2:
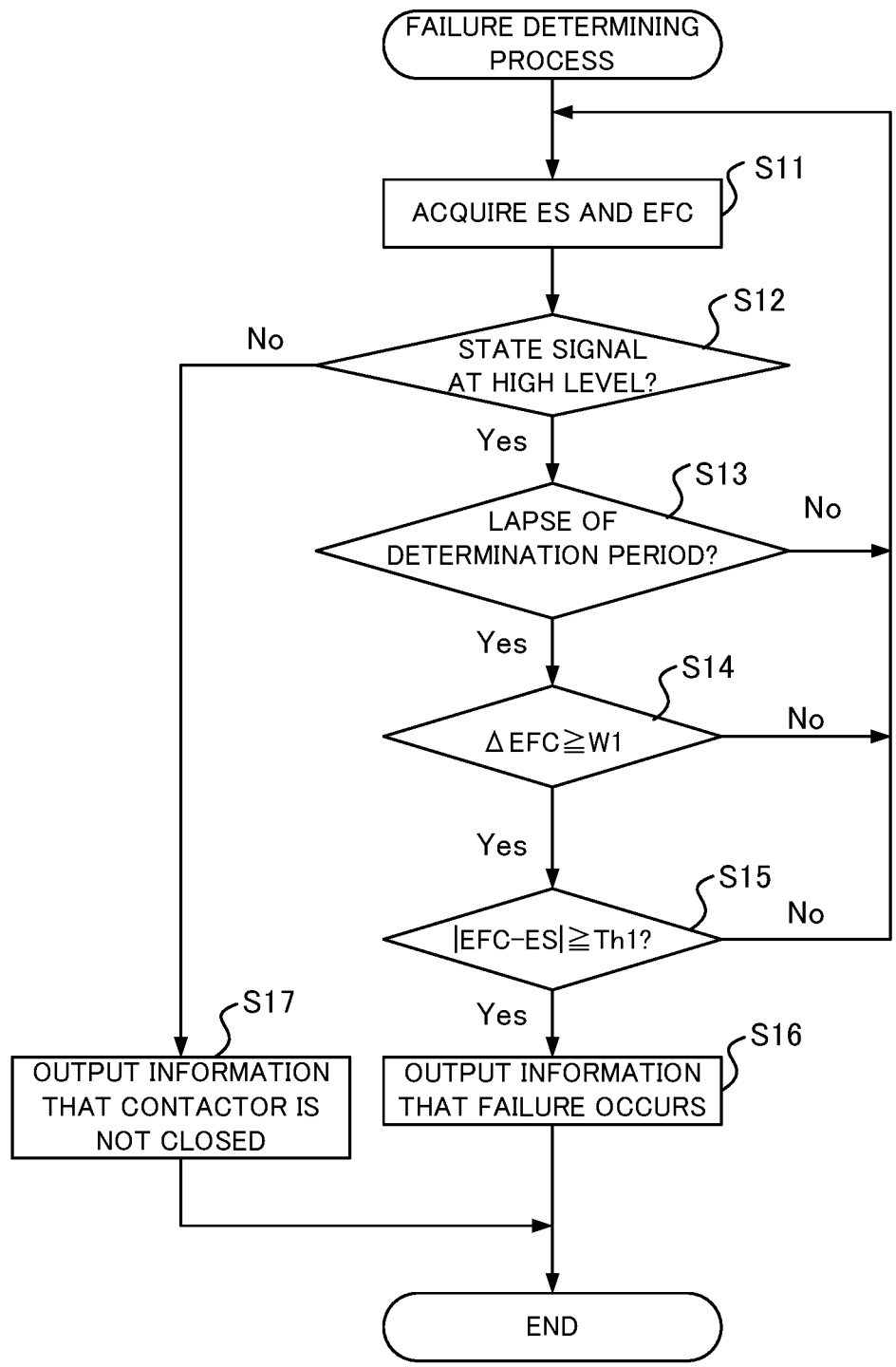
FIG. 2 is a flowchart of a failure determining process executed in the power conversion apparatus according to Embodiment 1.

In contrast, when any failure occurs in the contactor 11 after a temporal increase in the first voltage value EFC that follows the closing of the contactor 11 and the charging of the filter capacitor FC1, then the first voltage value EFC starts to decrease. The contactor controller 16 does not close the contactor 12 when the difference between the first voltage value EFC and the second voltage value ES is greater than or equal to the reference voltage difference. This configuration cannot activate the power converter 13 to drive the motor 51. Such a process of determining occurrence of a failure is explained with reference to FIG. 2.

When receiving an opening/closing instruction signal for instructing the closing of the contactor 11, the failure determiner 17 starts the process of determining whether a failure occurs in the contactor 11 and causes starting of the timer. The failure determiner 17 then acquires a first voltage value EFC from the first voltage measurer 14 and a second voltage value ES from the second voltage measurer 15, and stores the acquired values into the storage (step S11). The failure determiner 17 then determines whether the state signal output from a control circuit included in the contactor 11 is at a high level (step S12).

When the state signal is at a low level (step S12; No), the failure determiner 17 provides the display with information that the contactor 11 is not closed (step S17). The determination of No in step S12 means the situation in which the contactor 11 is open despite of the instruction to close the contactor 11. After step S17, the failure determiner 17 terminates the failure determining process.

When the state signal is at a high level (step S12; Yes), the failure determiner 17 determines whether a preset determination period has elapsed since the closing of the contactor 11 (step S13). Specifically, the failure determiner 17 determines whether the period measured by the timer started at the start of the failure determining process, has reached the determination period. When the determination period has not elapsed (step S13; No), the failure determiner 17 returns to step S11 and repeats the above-explained steps.

When the determination period has elapsed (step S13; Yes), the failure determiner 17 proceeds to step S14. The determination of Yes in step S13 means the situation in which the state signal has been at a high level over the determination period. The failure determiner 17 then calculates a reduction ΔEFC in the first voltage value EFC from the first voltage value EFC stored into the storage in step S11, and determines whether the reduction ΔEFC in the first voltage value EFC is greater than or equal to the reference value W1 (step S14). When any failure occurs in the contactor 11 after the start of charging of the filter capacitor FC1, the voltage between the terminals of the filter capacitor FC1 that has increased until the occurrence of the failure of the contactor 11 starts to decrease, because of the first voltage measurer 14 connected in parallel to the filter capacitor FC1. This configuration enables determination of occurrence of a failure in the contactor 11 on the basis of the reduction ΔEFC in the first voltage value EFC.

When the reduction ΔEFC in the first voltage value EFC is smaller than the reference value W1 (step S14; No), the failure determiner 17 returns to step S11 and repeats the above-explained steps. When the reduction ΔEFC in the first voltage value EFC is greater than or equal to the reference value W1 (step S14; Yes), the failure determiner 17 determines whether the absolute difference |EFC−ES| between the first voltage value EFC and the second voltage value ES after the lapse of the determination period is greater than or equal to the first threshold voltage Th1 (step S15).

In the case of a failure in the contactor 11 after the start of charging of the filter capacitor FC1, the voltage between the terminals of the filter capacitor FC1 decreases as explained above, resulting in a large difference between the first voltage value EFC and the second voltage value ES. Therefore, the comparison of the absolute difference |EFC−ES| between the first voltage value EFC and the second voltage value ES with the first threshold voltage Th1 enables determination of occurrence of a failure in the contactor 11. In the case of a drop in the DC voltage in the overhead wire 3, both of the first voltage value EFC and the second voltage value ES decrease. The comparison of the absolute difference |EFC−ES| between the first voltage value EFC and the second voltage value ES with the first threshold voltage Th1 in step S15 in addition to the determination in step S14 can reduce or prevent occurrence of a case in which the determination that a failure occurs in the contactor 11 is erroneously made upon a drop in the DC voltage in the overhead wire 3.

When determining that the difference between the first voltage value EFC and the second voltage value ES is smaller than the first threshold voltage Th1 (step S15; No), the failure determiner 17 returns to step S11 and repeats the above-explained steps. When determining that the difference between the first voltage value EFC and the second voltage value ES is greater than or equal to the first threshold voltage Th1 (step S15; Yes), the failure determiner 17 outputs a failure determination signal at a high level, which indicates occurrence of a failure in the contactor 11 (step S16).

As explained above, the power conversion apparatus 1 according to Embodiment 1 can determine whether a failure occurs in the contactor 11 after the closing of the contactor 11, on the basis of the state signal output from the contactor 11, the first voltage value EFC, and the second voltage value ES.

Embodiment 2

Figure 3:
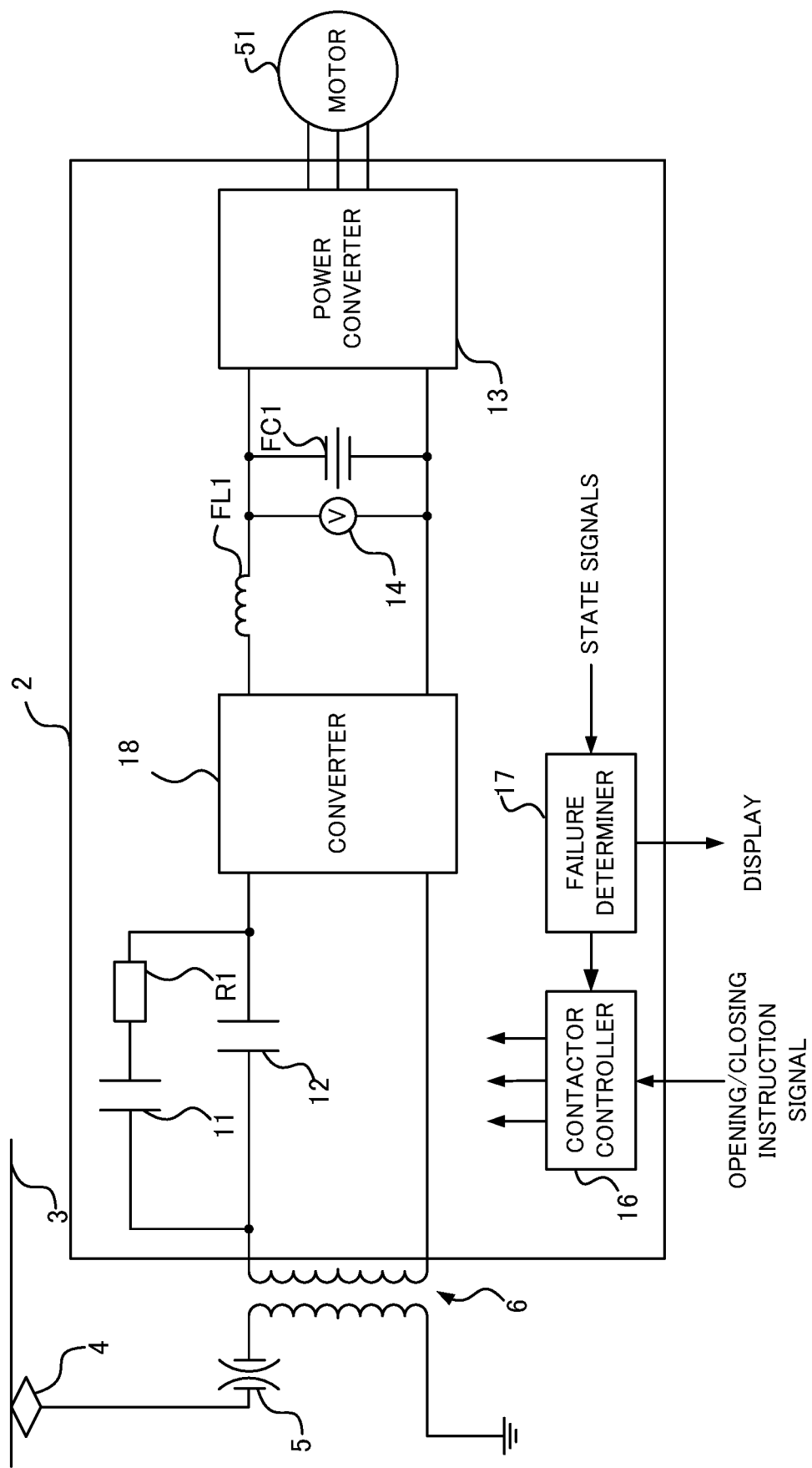
FIG. 3 is a block diagram of a power conversion apparatus according to Embodiment 2 of the present disclosure.

The power conversion apparatus can also be installed in an electric railway vehicle in an AC feeding system as well as the electric railway vehicle in a DC feeding system in Embodiment 1. A power conversion apparatus 2 according to Embodiment 2 in FIG. 3 is installed in an electric railway vehicle in an AC feeding system. The current collector 4 acquires AC power from a substation, which serves as an AC power source, via the overhead wire 3, and supplies the AC power via the high-speed circuit breaker 5 to a transformer 6. One of the primary terminals of the transformer 6 is connected to the high-speed circuit breaker 5, while the other is grounded. One of the secondary terminals of the transformer 6 is connected via the contactor 11 or the contactor 12 to one of the primary terminals of a converter 18. In detail, one of the secondary terminals of the transformer 18 is connected to one end of the contactor 11 and one end of the contactor 12, the other end of the contactor 11 is connected via the resistor R1 to the one of the primary terminals of the converter 18, and the other end of the contactor 12 is connected to the one of the primary terminals of the converter 18. The other of the secondary terminals of the transformer 6 is connected to the other of the primary terminals of the converter 18. The transformer 6 converts the AC voltage applied to the primary terminals into desired AC voltage, and outputs the AC power having the converted voltage to the power conversion apparatus 2 connected to the secondary terminals. The desired AC voltage indicates the voltage suitable for operations of the power conversion apparatus 2.

Unlike Embodiment 1, the contactors 11 and 12 each include an AC electromagnetic contactor. The contactors 11 and 12 have the basic configuration and operations similar to those in Embodiment 1. The contactor 11 outputs a state signal indicating whether the contactor 11 is closed. On the basis of this state signal, whether the contactor 11 is closed can be determined as in Embodiment 1.

The components of the power conversion apparatus 2 different from those of the power conversion apparatus 1 according to Embodiment 1 are described.

The power conversion apparatus 2 further includes the converter 18 to convert the AC power fed via the one of the primary terminals into DC power and output the DC power via the secondary terminals. The one of the primary terminals of the converter 18 is connected to the other end of the resistor R1 and the other end of the contactor 12. The other of the primary terminals of the converter 18 is connected to the other of the secondary terminals of the transformer 6. The one of the secondary terminals of the converter 18 is connected to one end of the filter reactor FL1. The other of the secondary terminals of the converter 18 is connected to the other of the primary terminals of the power converter 13 and the other end of the filter capacitor FC1. The non-illustrated switching controller controls the switching elements included in the converter 18, so that the converter 18 converts the AC power fed via the one of the primary terminals into DC power, and outputs the DC power via the secondary terminals.

The power conversion apparatus 2 is installed in the railway vehicle in an AC feeding system, and therefore excludes the second voltage measurer 15 included in the power conversion apparatus 1 according to Embodiment 1.

The failure determiner 17 determines whether a failure occurs in the contactor 11 on the basis of the state signal and the first voltage value EFC. In detail, the failure determiner 17 determines whether the state signal has been at a high level during the determination period and the first voltage value EFC after the lapse of the determination period is less than or equal to a second threshold voltage Th2, and then outputs the determination result to the display.

When determining that the state signal has been at a high level during the determination period and the first voltage value EFC after the lapse of the determination period is less than or equal to the second threshold voltage Th2, the failure determiner 17 supplies the display with a failure determination signal, which indicates occurrence of a failure in the contactor 11, as the determination result. The failure determiner 17 preliminarily retains the second threshold voltage Th2. The second threshold voltage Th2 is defined depending on the voltage between the terminals of the filter capacitor FC1. For example, the second threshold voltage Th2 is equal to the two thirds of the value of the voltage between the terminals of the fully-charged filter capacitor FC1.

The failure determination signal is at a high level, when the failure determiner 17 determines that the state signal has been at a high level during the determination period and the first voltage value EFC after the lapse of the determination period is less than or equal to the second threshold voltage Th2.

The failure determination signal is at a low level, when the failure determiner 17 determines that the state signal has not been at a high level during the determination period or the first voltage value EFC after the lapse of the determination period is higher than the second threshold voltage Th2.

Operations of the power conversion apparatus 2 having the above-described configuration are explained. The operation at the start of driving of the electric railway vehicle is similar to that in Embodiment 1.

In response to supply of an opening/closing instruction signal for instructing the closing of the contactor 11, the power conversion apparatus 2 starts the process of determining whether a failure occurs in the contactor 11, as in the power conversion apparatus 1 according to Embodiment 1. The process of determining occurrence of a failure executed in the power conversion apparatus 2 is explained with reference to FIG. 4.

Figure 4:
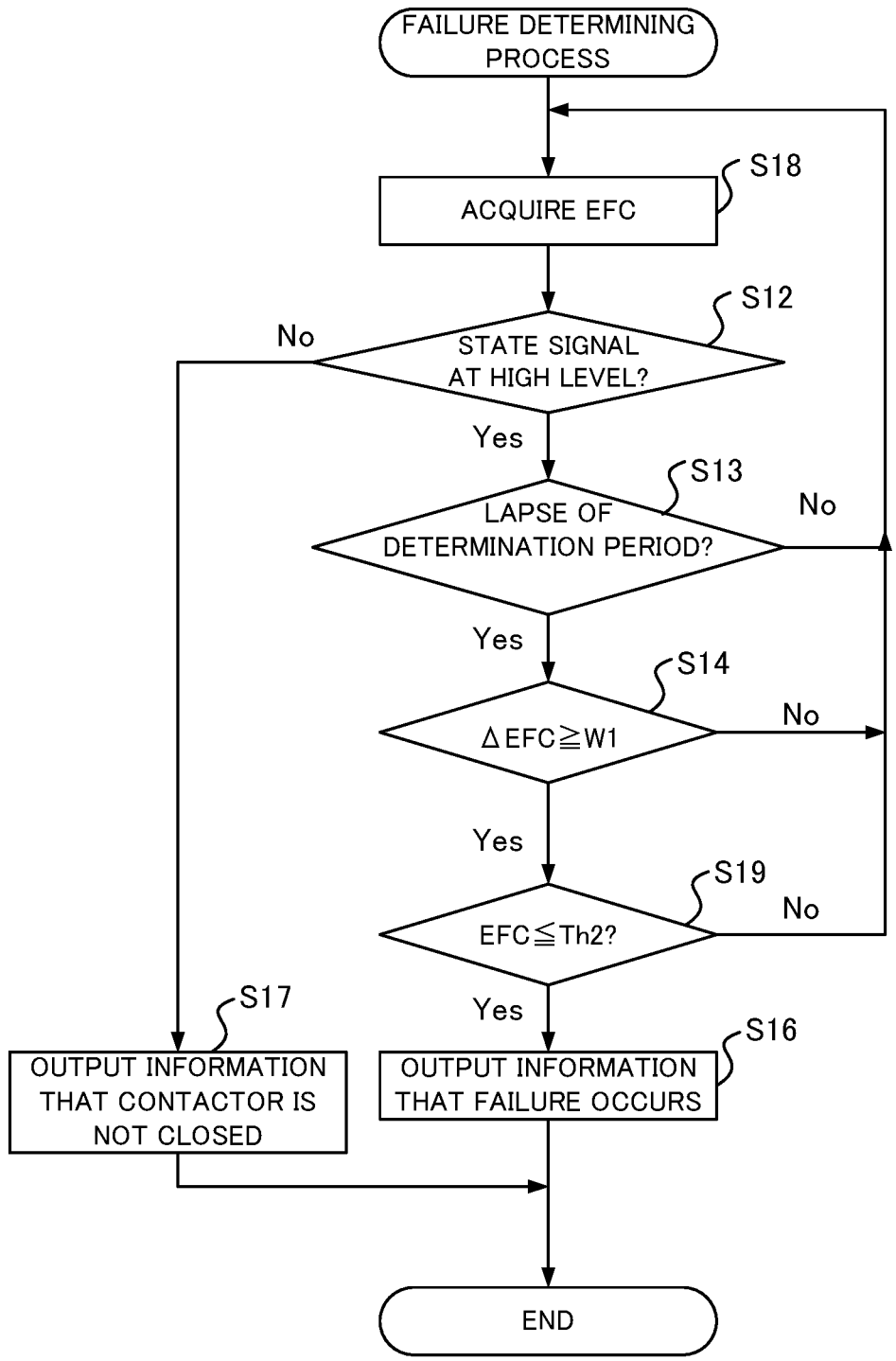
FIG. 4 is a flowchart of a failure determining process executed in the power conversion apparatus according to Embodiment 2.

When receiving an opening/closing instruction signal for instructing the closing of the contactor 11, the failure determiner 17 starts the process of determining whether a failure occurs in the contactor 11 and causes starting of the timer. The failure determiner 17 then acquires a first voltage value EFC from the first voltage measurer 14 and stores the acquired value into the storage (step S18). Steps S12-S14, S16, and S17 in FIG. 4 are similar to steps S12-S14, S16, and S17 in FIG. 2. When determining that the reduction ΔEFC in the first voltage value EFC is greater than or equal to the reference value W1 (step S14; Yes), the failure determiner 17 determines whether the first voltage value EFC is less than or equal to the second threshold voltage Th2 (step S19).

When a failure occurs in the contactor 11 after the start of charging of the filter capacitor FC1, the difference between the first voltage value EFC and the second threshold voltage Th2 increases due to a reduction in the voltage between the terminals of the filter capacitor FC1. Therefore, the comparison of the first voltage value EFC with the second threshold voltage Th2 enables determination of occurrence of a failure in the contactor 11. The comparison of the first voltage value EFC with the second threshold voltage Th2 in step S19 in addition to the determination in step S14 can reduce or prevent occurrence of a case in which the determination that a failure occurs in the contactor 11 is erroneously made upon a variation in the amplitude of AC voltage in the overhead wire 3.

When determining that the first voltage value EFC is higher than the second threshold voltage Th2 (step S19; No), the failure determiner 17 returns to step S18 and repeats the steps. When determining that the first voltage value EFC is less than or equal to the second threshold voltage Th2 (step S19; Yes), the failure determiner 17 supplies the display with a failure determination signal, which indicates occurrence of a failure in the contactor 11 (step S16).

As explained above, the power conversion apparatus 2 according to Embodiment 2 can determine whether a failure occurs in the contactor 11 after the closing of the contactor 11, on the basis of the state signal output from the contactor 11 and the first voltage value EFC.

The above-described embodiments of the present disclosure should not be construed as limiting the present disclosure. The power conversion apparatus 1 or 2 can be installed in any vehicle, machine, or the like, provided that the power conversion apparatus 1 or 2 is fed with electric power. Exemplary vehicles that can be provided with the power conversion apparatus 1 or 2 include diesel vehicles in addition to electric railway vehicles.

Figure 5:
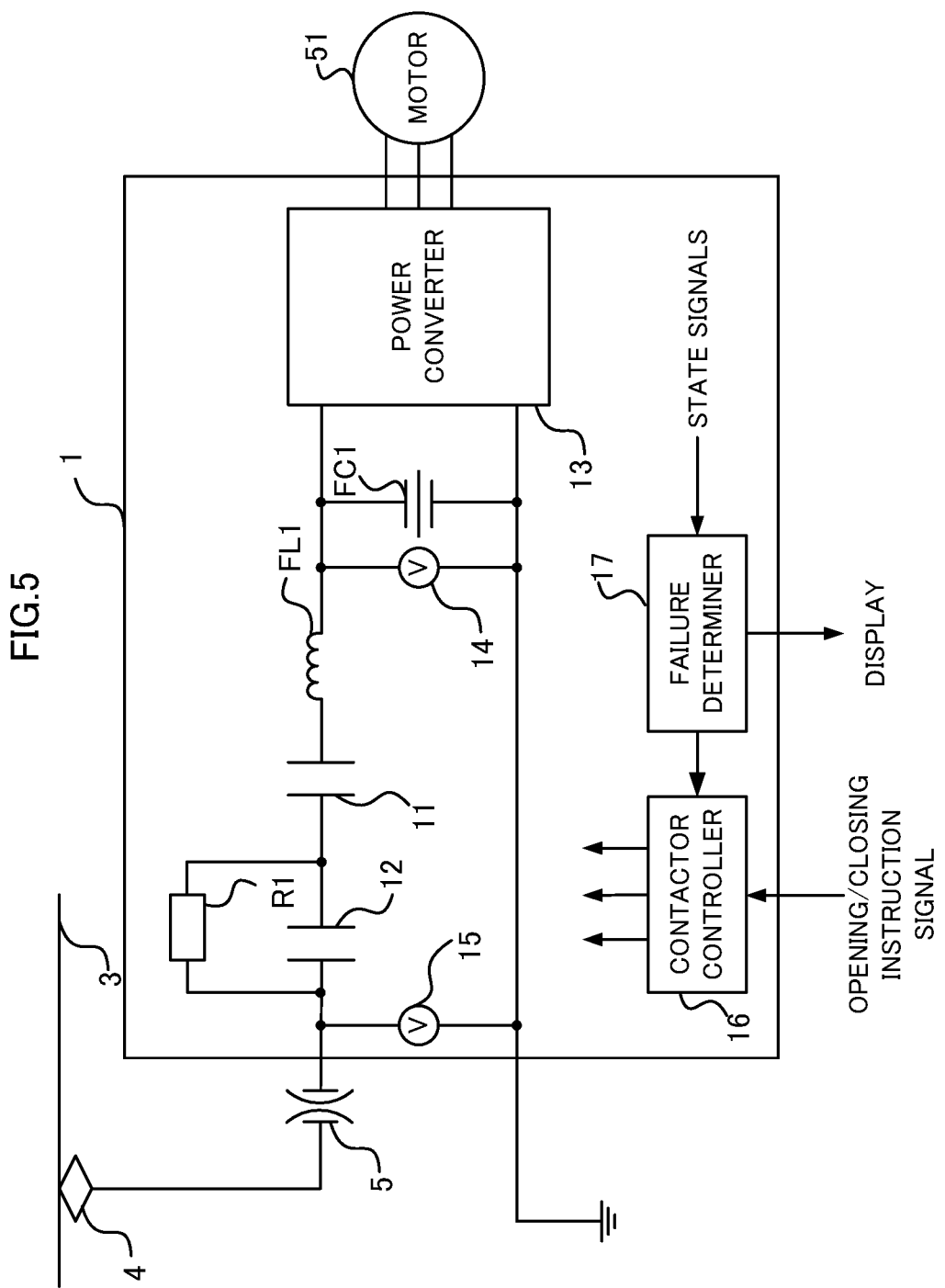
FIG. 5 is a block diagram of a power conversion apparatus according to a modified embodiment.

The above-described circuit configurations are mere examples. FIG. 5 illustrates another exemplary circuit configuration. As illustrated in FIG. 5, the contactors 11 and 12 may be connected in series and the resistor R1 may be provided in parallel to the contactor 12. In this configuration, when the difference between a first voltage value EFC and a second voltage value ES becomes smaller than a reference voltage difference after the closing of the contactor 11, the contactor controller 16 closes the contactor 12. The same modification can also be applied to the power conversion apparatus 2. Specifically, the contactors 11 and 12 may be connected in series and the resistor R1 may be provided in parallel to the contactor 12.

The occurrence of a failure may be determined by a method other than the above-explained examples in the power conversion apparatuses 1 and 2. Steps S14 and S15 in FIG. 2 may be executed in any order. That is, the failure determiner 17 included in the power conversion apparatus 1 may execute step S15 and then step S14. Also, steps S14 and S19 in FIG. 4 may be executed in any order. That is, the failure determiner 17 included in the power conversion apparatus 2 may execute step S19 and then step S14.

The power conversion apparatus 1 or 2 may also determine whether a failure occurs in the contactor 12 in addition to the determination of occurrence of a failure in the contactor 11. For example, when receiving an opening/closing instruction signal for instructing the closing of the contactor 12, the failure determiner 17 included in the power conversion apparatus 1 may determine whether a failure occurs in the contactor 12 on the basis of the state signal output from the contactor 12, the first voltage value EFC, and the second voltage value ES. In detail, the failure determiner 17 may determine whether (i) the state signal has been at a high level during the determination period since the closing of the contactor 12 and (ii) the reduction ΔEFC in the first voltage value EFC is greater than or equal to the reference value W1 and (iii) the difference between the first voltage value EFC and the second voltage value ES is greater than or equal to the first threshold voltage Th1, and then output the determination result.

In the case of the power conversion apparatus 1 or 2 installed in an electric railway vehicle in an AC feeding system, the failure determiner 17 may determine whether the state signal output from the contactor 12 has been at a high level during the determination period and the first voltage value EFC after the lapse of the determination period is less than or equal to the second threshold voltage Th2, and then output the determination result.

The power converter 13 should not necessarily include a VVVF inverter. The power converter 13 may include any power converter, provided that the power converter has primary terminals between which a filter capacitor is connected, and secondary terminals connected to a load, and supplies electric power to the load. For example, the power converter 13 may include a static inverter for suppling electric power to an illumination device or air conditioner.

The contactor controller 16 may acquire a failure determination signal from the failure determiner 17. In response to supply of a failure determination signal at a high level, the contactor controller 16 opens the contactor 11.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2 Power conversion apparatus
3 Overhead wire
4 Current collector
5 High-speed circuit breaker
6 Transformer
11, 12 Contactor
13 Power converter
14 First voltage measurer
15 Second voltage measurer
16 Contactor controller
17 Failure determiner
18 Converter
51 Motor
FC1 Filter capacitor
FL1 Filter reactor
R1 Resistor

The invention claimed is:

1. A power conversion apparatus comprising:
a power converter to convert DC power fed from a power source via one of primary terminals of the power converter into DC power or AC power, and supply the converted power to a load connected to secondary terminals of the power converter;
a filter capacitor having terminals connected between the primary terminals of the power converter and configured to be charged with electric power fed from the power source;
a contactor to electrically connect the power converter to the power source, or electrically disconnect the power converter from the power source;
a first voltage measurer to measure a first voltage value that is a value of a voltage between the terminals of the filter capacitor;
a contactor controller to, by closing the contactor, cause the contactor to electrically connect the power converter to the power source, or by opening the contactor, cause the contactor to electrically disconnect the power converter from the power source; and
a failure determiner to determine whether a failure occurs in the contactor, based on whether the contactor is kept closed during a preset determination period since closing of the contactor by the contactor controller, a variation in the first voltage value during the determination period, and the first voltage value after a lapse of the determination period.

2. The power conversion apparatus according to claim 1, wherein
the contactor outputs a state signal indicating whether the contactor is closed, and
the failure determiner determines whether a failure occurs in the contactor, based on the state signal and the variation in the first voltage value during the determination period.

3. The power conversion apparatus according to claim 1, wherein
the power source is a DC power source,
the power conversion apparatus further comprises a second voltage measurer to measure a second voltage value that is a value of a voltage between one end of the contactor and another of the primary terminals of the power converter, and
the failure determiner determines whether a failure occurs in the contactor, based on whether the contactor is kept closed during the determination period, the variation in the first voltage value during the determination period, and a difference between the first voltage value and the second voltage value after the lapse of the determination period.

4. The power conversion apparatus according to claim 2, wherein
the power source is a DC power source,
the power conversion apparatus further comprises a second voltage measurer to measure a second voltage value that is a value of a voltage between one end of the contactor and another of the primary terminals of the power converter, and
the failure determiner determines whether a failure occurs in the contactor, based on whether the contactor is kept closed during the determination period, the variation in the first voltage value during the determination period, and a difference between the first voltage value and the second voltage value after the lapse of the determination period.

5. The power conversion apparatus according to claim 1, wherein the power source is an AC power source.

6. The power conversion apparatus according to claim 2, wherein the power source is an AC power source.

7. The power conversion apparatus according to claim 3, wherein
the failure determiner
determines whether (i) the contactor is kept closed during the determination period and (ii) a reduction in the first voltage value during the determination period is greater than or equal to a reference value and (iii) an absolute difference between the first voltage value and the second voltage value after the lapse of the determination period is greater than or equal to a first threshold voltage, and
outputs a determination result.

8. The power conversion apparatus according to claim 4, wherein
the failure determiner
determines whether (i) the contactor is kept closed during the determination period and (ii) a reduction in the first voltage value during the determination period is greater than or equal to a reference value and (iii) an absolute difference between the first voltage value and the second voltage value after the lapse of the determination period is greater than or equal to a first threshold voltage, and
outputs a determination result.

9. The power conversion apparatus according to claim 7, wherein the failure determiner outputs, as the determination result, a failure determination signal indicating occurrence of a failure in the contactor, when the failure determiner determines that (i) the contactor is kept closed during the determination period and (ii) the reduction in the first voltage value during the determination period is greater than or equal to the reference value and (iii) the absolute difference between the first voltage value and the second voltage value after the lapse of the determination period is greater than or equal to the first threshold voltage.

10. The power conversion apparatus according to claim 8, wherein the failure determiner outputs, as the determination result, a failure determination signal indicating occurrence of a failure in the contactor, when the failure determiner determines that (i) the contactor is kept closed during the determination period and (ii) the reduction in the first voltage value during the determination period is greater than or equal to the reference value and (iii) the absolute difference between the first voltage value and the second voltage value after the lapse of the determination period is greater than or equal to the first threshold voltage.

11. The power conversion apparatus according to claim 1, wherein
the failure determiner
determines whether (i) the contactor is kept closed during the determination period and (ii) a reduction in the first voltage value during the determination period is greater than or equal to a reference value and (iii) the first voltage value after the lapse of the determination period is less than or equal to a second threshold voltage, and
outputs a determination result.

12. The power conversion apparatus according to claim 2, wherein
the failure determiner
determines whether (i) the contactor is kept closed during the determination period and (ii) a reduction in the first voltage value during the determination period is greater than or equal to a reference value and (iii) the first voltage value after the lapse of the determination period is less than or equal to a second threshold voltage, and
outputs a determination result.

13. The power conversion apparatus according to claim 5, wherein
the failure determiner
determines whether (i) the contactor is kept closed during the determination period and (ii) a reduction in the first voltage value during the determination period is greater than or equal to a reference value and (iii) the first voltage value after the lapse of the determination period is less than or equal to a second threshold voltage, and
outputs a determination result.

14. The power conversion apparatus according to claim 6, wherein
the failure determiner
determines whether (i) the contactor is kept closed during the determination period and (ii) a reduction in the first voltage value during the determination period is greater than or equal to a reference value and (iii) the first voltage value after the lapse of the determination period is less than or equal to a second threshold voltage, and
outputs a determination result.

15. The power conversion apparatus according to claim 11, wherein the failure determiner outputs, as the determination result, a failure determination signal indicating occurrence of a failure in the contactor, when the failure determiner determines that (i) the contactor is kept closed during the determination period and (ii) the reduction in the first voltage value during the determination period is greater than or equal to the reference value and (iii) the first voltage value after the lapse of the determination period is less than or equal to the second threshold voltage.

16. The power conversion apparatus according to claim 12, wherein the failure determiner outputs, as the determination result, a failure determination signal indicating occurrence of a failure in the contactor, when the failure determiner determines that (i) the contactor is kept closed during the determination period and (ii) the reduction in the first voltage value during the determination period is greater than or equal to the reference value and (iii) the first voltage value after the lapse of the determination period is less than or equal to the second threshold voltage.

17. The power conversion apparatus according to claim 1, wherein the contactor controller opens the contactor when the failure determiner determines that a failure occurs in the contactor.

18. The power conversion apparatus according to claim 2, wherein the contactor controller opens the contactor when the failure determiner determines that a failure occurs in the contactor.

19. A failure determining method comprising:
determining whether a failure occurs in a contactor, based on whether the contactor is kept closed during a preset determination period since closing of the contactor, a variation in a value of a voltage between terminals of a filter capacitor during the determination period, and a value of the voltage between the terminals of the filter capacitor after a lapse of the determination period, the contactor being configured to electrically connect a power converter to a power source or electrically disconnect the power converter from the power source, the power converter being configured to convert DC power fed from the power source via primary terminals of the power converter into DC power or AC power and supply the converted power to a load connected to secondary terminals of the power converter, the filter capacitor being connected between the primary terminals of the power converter.

* * * * *